United States Patent
Vos et al.

(10) Patent No.: US 9,628,474 B2
(45) Date of Patent: Apr. 18, 2017

(54) METHOD AND APPARATUS FOR ASSOCIATING IDENTITY MODULES AND TERMINAL EQUIPMENT

(75) Inventors: Gustav Gerald Vos, British Columbia (CA); Steven Lawrence Gielty, British Columbia (CA)

(73) Assignee: SIERRA WIRELESS, INC., Richmond, British Columbia (CA)

( * ) Notice: Subject to any disclaimer, the term of this patent is extended or adjusted under 35 U.S.C. 154(b) by 784 days.

(21) Appl. No.: 13/129,660

(22) PCT Filed: Nov. 17, 2009

(86) PCT No.: PCT/CA2009/001623
§ 371 (c)(1),
(2), (4) Date: Aug. 10, 2011

(87) PCT Pub. No.: WO2010/054472
PCT Pub. Date: May 20, 2010

(65) Prior Publication Data
US 2011/0287740 A1    Nov. 24, 2011

Related U.S. Application Data

(60) Provisional application No. 61/115,467, filed on Nov. 17, 2008.

(51) Int. Cl.
*H04L 29/06* (2006.01)
*H04W 4/00* (2009.01)
(Continued)

(52) U.S. Cl.
CPC ........... *H04L 63/0853* (2013.01); *H04W 4/00* (2013.01); *H04W 4/003* (2013.01); *H04W 4/005* (2013.01); *H04W 12/08* (2013.01); *H04W 8/183* (2013.01)

(58) Field of Classification Search
CPC .. H04L 63/0853; H04W 12/08; H04W 4/005; H04W 4/003; H04W 4/00; H04W 8/183
(Continued)

(56) References Cited

U.S. PATENT DOCUMENTS 5,600,708 A * 2/1997 Meche et al. ................. 455/411
5,887,253 A * 3/1999 O'Neil et al. ................. 455/418
(Continued)

FOREIGN PATENT DOCUMENTS

WO    WO 95/26115    9/1995
WO    WO 96/38994    12/1996

OTHER PUBLICATIONS

ETSI TS 102 221 V8.3.0, "Smart Cards; UICC-Terminal interface; Physical and Logical Characteristics (Release 8)," European Telecommunications Standards Institute, Aug. 2009.
(Continued)

*Primary Examiner* — Christopher M Brandt
(74) *Attorney, Agent, or Firm* — Hahn Loeser & Parks, LLP—San Diego

(57) ABSTRACT

The present invention provides method, apparatus and computer program product for facilitating verification of an identity module, such as associated with a UICC, operatively coupled to a terminal equipment, such as a machine-type communication device. Upon determining that the identity module is in a bonded state, one or more bonding identifiers are read from the identity module and compared with at least a predetermined portion of the terminal equipment identifier, such as an IMEI, stored in the terminal equipment. If at least one of the bonding identifiers corresponds with at least a predetermined portion of the terminal equipment identifier, the identity module and/or the terminal equipment are shifted into predetermined operating conditions. A bonding process may also be performed, whereby
(Continued)

the identity module acquires the terminal equipment identifier of currently associated terminal equipment and stores a bonding identifier in identity module memory based thereon.

17 Claims, 2 Drawing Sheets

(51) Int. Cl.
*H04W 12/08* (2009.01)
*H04W 8/18* (2009.01)

(58) Field of Classification Search
USPC .................................................. 455/410, 411
See application file for complete search history.

(56) References Cited

U.S. PATENT DOCUMENTS

| | | | | |
|---|---|---|---|---|
| 5,898,783 | A * | 4/1999 | Rohrbach | ............... 340/5.31 |
| 6,011,976 | A | 1/2000 | Michaels | |
| 6,138,005 | A | 10/2000 | Park | |
| 6,141,563 | A | 10/2000 | Miller | |
| 6,850,777 | B1 | 2/2005 | Estes | |
| 6,975,883 | B1 | 12/2005 | Richter | |
| 7,000,115 | B2 | 2/2006 | Lewis | |
| 7,089,036 | B2 * | 8/2006 | Prise | ............... 455/558 |
| 7,137,003 | B2 | 11/2006 | Krishnan | |
| 7,151,922 | B2 | 12/2006 | Sashihara | |
| 7,174,159 | B2 | 2/2007 | Guirauton | |
| 7,248,896 | B2 | 7/2007 | Luo | |
| 7,496,381 | B2 * | 2/2009 | Kim | ............... 455/558 |
| 7,762,463 | B2 | 7/2010 | Laviolette | |
| 7,941,184 | B2 | 5/2011 | Prendergast | |
| 8,032,084 | B2 | 10/2011 | Demirbasa | |
| 8,064,598 | B2 | 11/2011 | Vaha-Sipila | |
| 8,666,366 | B2 * | 3/2014 | DeAtley | ............... 455/411 |
| 2001/0027117 | A1 * | 10/2001 | Alanara | ............... 455/551 |
| 2001/0029586 | A1 | 10/2001 | Coutant | |
| 2004/0005912 | A1 | 1/2004 | Hubbe | |
| 2004/0204003 | A1 | 10/2004 | Soerensen et al. | |
| 2005/0282584 | A1 * | 12/2005 | Faisy | ............... 455/558 |
| 2006/0121882 | A1 * | 6/2006 | Zhao et al. | ............... 455/411 |
| 2006/0206710 | A1 | 9/2006 | Gehrmann | |
| 2008/0003979 | A1 | 1/2008 | Jang | |
| 2008/0014869 | A1 | 1/2008 | Demirbasa | |
| 2008/0032743 | A1 * | 2/2008 | Lee | ............... 455/558 |
| 2008/0113687 | A1 | 5/2008 | Prendergast | |
| 2008/0185436 | A1 | 8/2008 | Laviolette | |
| 2008/0209206 | A1 | 8/2008 | Vaha-Sipila | |
| 2009/0191918 | A1 * | 7/2009 | Mardiks | ............... 455/558 |
| 2010/0174607 | A1 * | 7/2010 | Henkin et al. | ............... 705/14.53 |

OTHER PUBLICATIONS

ETSI TS 122 022 V7.1.0, "Digital cellular telecommunications system (Phase 2+); Universal Mobile Telecommunications System (UMTS); Personalization of Mobile Equipment (ME); Mobile functionality specification (3GPP TS 22.02, version 7.1.0 Release 7)," ETSI 3rd Generation Partnership Project, Apr. 2008.

ETSI TS 122 022 V7.2.0, "Digital cellular telecommunications system (Phase 2+); Universal Mobile Telecommunications System (UMTS); Personalization of Mobile Equipment (ME); Mobile functionality specification (3GPP TS 22.02, version 7.2.0 Release 7)," ETSI 3rd Generation Partnership Project, Jul. 2008.

ETSI TS 123 003 V7.8.0, "Digital cellular telecommunications system (Phase 2+); Universal Mobile Telecommunications System (UMTS); Numbering, addressing and identification; (3GPP TS 23.003, version 7.8.0 Release 7)," ETSI 3rd Generation Partnership Project, Oct. 2008.

TIA-1058, "UICC-Terminal Interface Physical and Logical Characteristics for cdma2000® Spread Spectrum Systems," Telecommunications Industry Association, Jan. 2009.

* cited by examiner

METHOD AND APPARATUS FOR ASSOCIATING IDENTITY MODULES AND TERMINAL EQUIPMENT

CROSS-REFERENCE TO RELATED APPLICATIONS

The present application is a U.S. National Stage entry under 35 U.S.C. §371 of International Application No. PCT/CA2009/001623, filed on Nov. 17, 2009, designating the United States of America and published in English on May 20, 2010, which in turn claims priority to U.S. Patent Application No. 61/115,467 filed on Nov. 17, 2008, each of which is hereby incorporated by reference in its entirety.

FIELD OF THE INVENTION

The present invention pertains in general to telecommunication systems and in particular to systems of radiotelephones and identity modules, such as Universal Integrated Circuit Cards (UICCs), operatively coupled thereto.

BACKGROUND

Providing management and security features in radio communication systems such as cellular telecommunication networks often involves locking of equipment or information stored thereon to discourage or decrease undesired activities, such as equipment theft, misappropriation, fraud, or the like. Terminal equipment, such as mobile equipment, radiotelephone handsets or remote machine type communication (MTC) equipment deployed in the field and operatively coupled to a radio communication network or base station thereof may be particularly susceptible to such activities.

In several systems, terminal equipment is configured to operate in conjunction with a removable card containing an identity module entity therein, such as a Subscriber Identity Module (SIM) card. UICC or the like. Strategies for providing management and security features for the terminal equipment, based on the presence of a removable identity module card have been proposed or implemented in radio communication systems.

For example, U.S. Pat. No. 6,141,563 discloses a SIM card secured subscriber unit, such as a radiotelephone handset, which is fully operable only with a SIM card having stored therein a specific signature value. When a SIM card is inserted, the signature value stored thereon is compared against a list of authorized signature values stored in memory of the subscriber unit. If the SIM card is not valid, no use of the subscriber unit is permitted. Thus, associated with each serialized subscriber equipment there is a corresponding serialized SIM card which acts as a key to enable operation of the subscriber unit. This may be used to decrease theft or misappropriation of subscriber units.

In addition, the 3GPP technical standard entitled "Digital cellular telecommunications system (Phase 2+); Universal Mobile Telecommunications System (UMTS); Personalization of Mobile Equipment (ME); Mobile functionality specification (3GPP TS 22.02, version 7.2.0 Release 7)" discloses a process for limiting mobile equipment such as a radiotelephone handset, such that the mobile equipment is only usable with a limited set of identity module cards. In an initial personalization process, codes are stored in the mobile equipment. For example, the codes may be read from an identity module card inserted during initial personalization or programmed during manufacture or initial set-up of the mobile equipment. Subsequently, whenever an identity module card is inserted, or the mobile equipment is powered up, codes are read from the identity module and checked against the codes stored in the mobile equipment during initial personalization. If there is no match then the mobile equipment is restricted to emergency calls only. Personalization may discourage theft of mobile equipment or use of mobile equipment on unauthorized networks or regions, by locking mobile equipment for use only with specified identity modules or groups thereof.

However, neither of the above approaches facilitates providing adequate management or security for identity module equipment such as UICCs, or information stored thereon.

In some approaches, Personal Identification Number (PIN) locking mechanisms are used to safeguard against theft of identity modules or identity module cards, such as UICCs, and associated terminal equipment. A PIN locking mechanism uses one or more numeric passwords, wherein a user is required to enter a PIN code upon device power-up in order to access full device functionality. However, PIN locking mechanisms rely on a human user to remember and enter a PIN, which may not be appropriate in some cases, for example when a user forgets the PIN, or when the terminal equipment is not immediately associated with a user.

MTC terminal equipment, for example used in remote, unmanned monitoring or other automated or semi-automated operations, typically does not require a local user in operation. In this case there is no user to enter a PIN upon device power-up. Therefore, to implement a PIN locking mechanism, an MTC terminal equipment would be required to itself enter the PIN upon power-up. Although this is possible with added complexity to the MTC terminal equipment, the management of different PIN codes for each MTC terminal equipment would be difficult or even unworkable. Furthermore, if the same PIN code were used for multiple or all MTC terminal equipments, the PIN locking mechanism would lose most of its provided security. Finally, since the PIN would be stored on the MTC terminal equipment, it may be possible to extract the PIN upon theft of the MTC terminal equipment.

Furthermore, MTC terminal equipments, such as remote metering devices, are often located in remote areas and without surveillance after installation. The remote locales make this type of equipment more susceptible to tampering by unauthorised persons. The tampering of the MTC terminal equipment is often accompanied by damage to the metering device. Furthermore, theft or fraudulent modification of an MTC terminal equipment or associated identity module card, such as a UICC, may not be detected and reported as quickly as would be typical for a traditional user-operated device. As detection of fraudulent use of an identity module card is difficult, fraud will likely occur and last until vandalism and theft of the identity module card is detected.

Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method, apparatus and computer program product for associating identity modules and terminal equipment. In accordance with an aspect of the present invention, there is provided a method for facilitating verification of an identity module operatively coupled to a terminal equipment, the method comprising: determining if the identity module is in a bonded state; and if the identity module is in said bonded state: reading one or more bonding identifiers from the identity module; comparing the one or more bonding identifiers with at least a predetermined portion of a terminal equipment identifier stored in the terminal equipment; and shifting at least one of the identity module and the terminal equipment into predetermined operating conditions if at least one of the one or more bonding identifiers corresponds with at least said predetermined portion of the terminal equipment identifier.

In accordance with another aspect of the present invention, there is provided an apparatus for facilitating verification of an identity module operatively coupled to a terminal equipment, the apparatus comprising a processing module operatively coupled to the identity module and the terminal equipment, the processing module configured to: determine if the identity module is in a bonded state; and if the identity module is in said bonded state: read one or more bonding identifiers from the identity module; compare the one or more bonding identifiers with at least a predetermined portion of a terminal equipment identifier stored in the terminal equipment; and shift at least one of the identity module and the terminal equipment into predetermined operating conditions if at least one of the one or more bonding identifiers corresponds with at least said predetermined portion of the terminal equipment identifier.

In accordance with another aspect of the present invention, there is provided a computer program product comprising a memory having embodied thereon statements and instructions for execution by a computer, thereby causing the computer to perform a method for facilitating verification of an identity module operatively coupled to a terminal equipment, the method comprising the steps of: determining if the identity module is in a bonded state; and if the identity module is in said bonded state: reading one or more bonding identifiers from the identity module; comparing the one or more bonding identifiers with at least a predetermined portion of a terminal equipment identifier stored in the terminal equipment; and shifting at least one of the identity module and the terminal equipment into predetermined operating conditions if at least one of the one or more bonding identifiers corresponds with at least said predetermined portion of the terminal equipment identifier.

DETAILED DESCRIPTION OF THE INVENTION

Definitions

Figure 1:
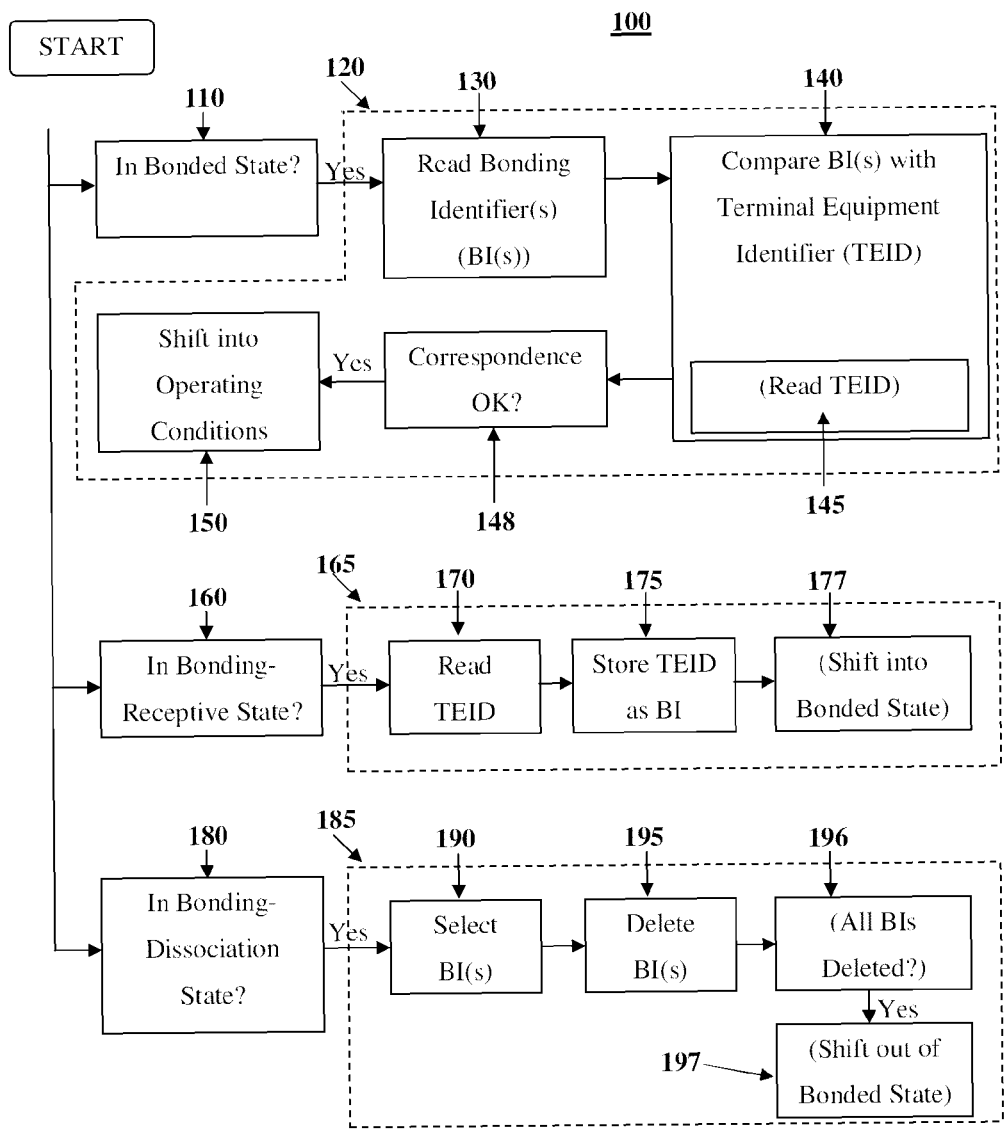
FIG. 1 illustrates a method facilitating verification of an identity module operatively coupled to terminal equipment according to embodiments of the present invention.

As used herein, the term "terminal equipment" (TE) refers to radio communication equipment, such as a radiotelephone, mobile handset. MTC terminal equipment, or other device, capable of connecting to a radio communication network such as a cellular network.

As used herein, the term "identity module" refers to a software or firmware application and associated memory, which is used for facilitating authentication and/or security when connecting a terminal equipment to a network such as a cellular network. For example, identity modules may be associated with subscriber identity module (SIM), universal subscriber identity module (USIM), or CDMA subscriber identity module (CSIM).

As used herein, the term "identity module card" refers to a physical device, such as a removable smart card, which contains stored thereon an identity module. For example, in a UMTS network a UICC may contain a USIM application; in a GSM network, a SIM card may contain a SIM application; in a CDMA network a R-UIM or UICC may contain a SIM application and/or CSIM application.

As used herein, the term "terminal equipment identifier" refers to an electronically stored value used for identification of terminal equipment. For example, in GSM networks, a unique international terminal equipment identity (IMEI) number is permanently associated and stored on each relevant terminal equipment. Mobile equipment identifiers (MEIDs) and electronic serial numbers (ESNs) may also fulfill the role of terminal equipment identifier. In some embodiments, a terminal equipment identifier may be an electronic certificate, which includes information relating to the terminal equipment with which the terminal equipment identifier is associate, wherein said information relates to one or more of approval status, features, optimizations, terminal equipment type, or the like.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for associating identity modules and terminal equipment, for example for facilitating verification of an identity module operatively coupled to terminal equipment.

A method in accordance with the present invention comprises determining if the identity module is in a bonded state. If the identity module is in said bonded state, the method further comprises reading one or more bonding identifiers from the identity module and comparing the one or more bonding identifiers with at least a predetermined portion of a terminal equipment identifier stored in the terminal equipment. The method further comprises shifting at least one of the identity modules and the terminal equipment into predetermined operating conditions if, upon comparison, at least one of the one or more bonding identifiers corresponds with at least said predetermined portion of the terminal equipment identifier. The method may be wholly or partially automated, for example by software and/or firmware installed on the identity module, terminal equipment, or a combination thereof.

An apparatus in accordance with the present invention comprises a processing module operatively coupled to the identity module and the terminal equipment. The processing module may be contained in or associated with an identity module card such as a smart card, UICC or SIM card, for example. The processing module is configured to determine if the identity module is in a bonded state. If the identity module is in said bonded state, the apparatus is further configured to read one or more bonding identifiers from the identity module. The apparatus is further configured to compare the one or more read bonding identifiers with at least a predetermined portion of a terminal equipment identifier stored in the terminal equipment. The apparatus is further configured to shift at least one of the identity module and the terminal equipment into predetermined operating conditions if, upon comparison, at least one of the one or more bonding identifiers corresponds with at least said predetermined portion of the terminal equipment identifier.

In some embodiments, method or apparatus according to the present invention are configured to store only one bonding identifier in the bonded state. In other embodiments, plural bonding identifiers, ranges of bonding identifiers, or bonding identifiers with wildcard portions may be stored.

In some embodiments, method or apparatus according to the present invention are further configured for determining if the identity module is in a bonding-receptive state; and if so, reading at least a portion of the terminal equipment identifier from the terminal equipment; and storing at least a portion of the terminal equipment identifier in the identity module as a bonding identifier. In some embodiments, method or apparatus according to the present invention are further configured for determining if the identity module is in a bonding-dissociation state, and if so, accessing and deleting one or more bonding identifiers held in memory of the identity module. Entering into bonding-receptive and bonding-dissociation states may require input of a password, PIN, or other authentication information. Entering into a bonding-receptive state may be performed automatically, for example if no bonding identifier is currently stored in the identity module. In other embodiments, the bonding-receptive state and/or bonding-dissociation state are inaccessible once the identity module is put into service, for example bonded with terminal equipment.

FIG. 1 illustrates a method 100 for facilitating verification of an identity module operatively coupled to terminal equipment in accordance with an embodiment of the present invention. The method 100 comprises the step 110 of determining if the identity module is in a bonded state. For example, the identity module may be determined to be in a bonded state if a bonding identifier is stored in a predetermined memory location of the identity module, if a memory location of the identity module is associated with a flag variable set to indicate that the identity module is in a bonded state, or the like, or a combination thereof. If the identity module is determined to be in a bonded state, then a verification process 120 is performed. The verification process 120 involves reading 130 one or more bonding identifiers from the identity module, for example by accessing and reading predetermined memory locations of electronic memory contained within the identity module or identity module card. The verification process 120 further involves comparing 140 the one or more bonding identifiers with at least a predetermined portion of a terminal equipment identifier stored in the terminal equipment, such as an IMEI stored in non-volatile memory of the terminal equipment. Comparing 140 may comprise reading 145 at least a relevant portion of the terminal equipment identifier from memory of the terminal equipment and performing a bit-by-bit or symbol-by-symbol comparison between at least corresponding portions of bonding identifier and terminal equipment identifier. The verification process 120 further involves shifting 150 at least one of the identity module and the terminal equipment into predetermined operating conditions if at least one of the one or more bonding identifiers corresponds 148 with at least said predetermined portion of the terminal equipment identifier. For example, the predetermined operating conditions may correspond to allowing a SIM or USIM application to run on the identity module, thereby unlocking full communication functionality of the terminal equipment and identity module. The act of determining correspondence 148 between bonding identifier and terminal equipment identifier may comprise obtaining the result of comparison 140 between predetermined portions of the bonding identifier and the terminal equipment identifier and declaring a correspondence if said comparison reveals a match between said portions.

FIG. 1 further illustrates an optional step of determining 160 if the identity module is in a bonding-receptive state, and, if so, performing a bonding process 165, which comprises reading 170 at least a portion of the terminal equipment identifier from the terminal equipment, and storing 175 at least a portion of the terminal equipment identifier in the identity module as a bonding identifier. The bonding process 165 may further comprise shifting 177 the identity module into a bonded state if it is not already in a bonded state, for example implicitly by writing the bonding identifier to memory, or explicitly by setting a flag variable contained in memory of the identity module or identity module card.

FIG. 1 further illustrates an optional step of determining 180 if the identity module is in a bonding-dissociation state, and, if so, performing a bonding-dissociation process 185, which comprises selecting 190 one or more bonding identifiers stored in memory of the identity module, and deleting, effectively deleting or modifying 195 the selected bonding identifiers. Entering the bonding-dissociation process may require a password or PIN to be entered by a local or remote user. Entering the bonding-dissociation process may further or alternatively involve powering the identity module within a specialized device such as a dedicated maintenance device. The bonding-dissociation process 185 may further comprise determining 196 if all bonding identifiers are deleted and, if so, shifting 197 the identity module out of the bonded state, for example implicitly by clearing or deleting the bonding identifier memory locations, or explicitly by clearing a flag variable contained in memory of the identity module or identity module card. In some embodiments, shifting 197 out of the bonded state may also be associated with shifting into a bonding-receptive state.

Figure 2:
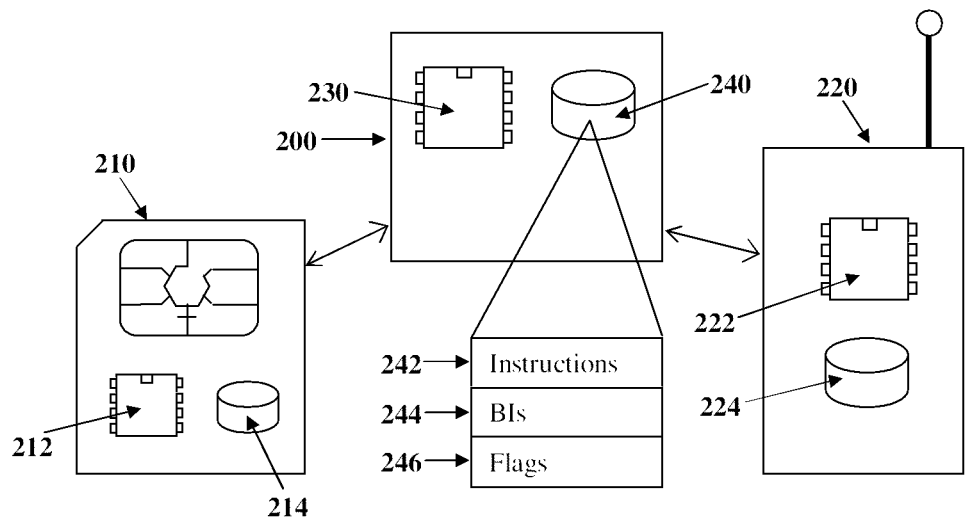
FIG. 2 illustrates an apparatus for facilitating verification of an identity module operatively coupled to terminal equipment according to an embodiment of the present invention.

FIG. 2 illustrates an apparatus 200 for facilitating verification of an identity module 210 operatively coupled to terminal equipment 220, in accordance with an embodiment of the present invention. The terminal equipment 220 may be a cellular telephone. PDA, laptop, plug-in wireless adapter, or other device capable of radio communication over a wireless network. The identity module may be associated with an application aboard an identity module card such as a plug-in smart card, memory module. SIM card, UICC, R-UIM or the like. The apparatus 200 is operatively coupled to the identity module 210 and the terminal equipment 220.

The apparatus 200 comprises a processing module including a processor 230 operatively coupled to a memory 240. The processor 230 may be a microprocessor, microcontroller, or the like. The memory 240 may be a volatile or non-volatile memory, RAM. ROM, solid-state, optical, magnetic, or other memory as would be readily understood by a worker skilled in the art, or a combination thereof. The memory 240 may contain encoded therein instructions 242 for performing functionality of the apparatus as described herein.

In some embodiments, the processing module, or components thereof, such as processor 230 and memory 240, may be integral to the identity module 210, the terminal equipment 220, or a combination thereof. For example, an identity module 210 may be associated with a smart card having an integral microprocessor 212 and solid-state memory 214, respectively operating as the processing module 230 and memory 240 of the apparatus. As another example, at least some activities of the processor 230 may be performed by a microprocessor 222 of the terminal equipment 220.

In some embodiments, at least a portion of the apparatus memory 240 is integral to the identity module and configured to store one or more bonding identifiers, such as in memory location 244. In other embodiments, the bonding identifiers may be stored in other memory 214 of the identity module or identity module card and accessed by the apparatus. The apparatus 200 is further operatively coupled to the terminal equipment 220 by one or more data channels by which a terminal equipment identifier such as an IMEI may be accessed and provided to the apparatus 200.

For example, in some embodiments, the apparatus 200 may be coupled to the microprocessor 222 of the terminal equipment 220 and capable of requesting that the microprocessor 222 perform a memory access operation which accesses non-volatile memory 224 of the terminal equipment 220 to obtain and provide a terminal equipment identifier held therein to the apparatus 200. Communication and data transfer protocols associated with the terminal equipment 220 would be readily understood by a worker skilled in the art. For example, interfaces between a identity module card and a terminal equipment are specified in "ETSI TS 102 221 V8.3.0. Smart Cards; UICC-Terminal interface; Physical and Logical Characteristics (Release 8)." European Telecommunications Standards Institute. August, 2009, and "TIA-1058 UICC-Terminal Interface Physical and Logical Characteristics for cdma2000® Spread Spectrum Systems."

In some embodiments, the apparatus memory 240 may further include memory locations 246 having contents indicative of one or more flag variables indicating a state of the apparatus 200.

Figure 3:
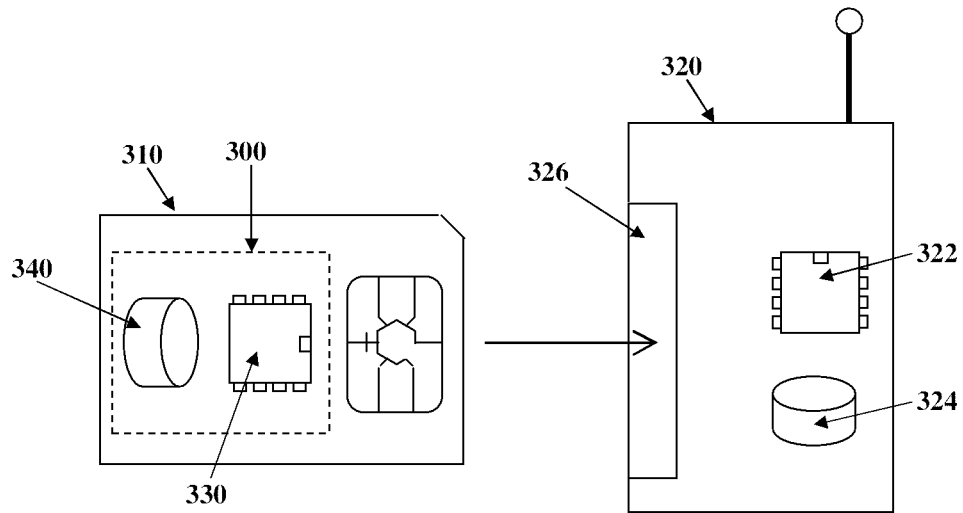
FIG. 3 illustrates an apparatus for facilitating verification of an identity module operatively coupled to terminal equipment according to another embodiment of the present invention.

FIG. 3 illustrates another embodiment of an apparatus 300 for facilitating verification of an identity module in accordance with the present invention, wherein the apparatus 300 is substantially associated with an identity module card 310, such as a UICC or other smart card. For example, the apparatus 300 may comprise a processing module comprising a microprocessor 330 and solid state memory 340 both formed on the identity module card 310. The apparatus 300 may be associated with a configuration of the identity module card 310 when appropriate instructions encoded in memory 340 are executed on the microprocessor 330. For example, the apparatus 300 may correspond with one or more functional aspects of a SIM or USIM application running substantially on the identity module card 310. Thus, the apparatus may co-exist substantially concurrently or sequentially with other apparatus similarly enabled by the identity module card 310 or identity module thereof.

The identity module card 310 is configured to fit in a slot 326 of the terminal equipment 320, the slot providing operative coupling between the identity module card 310 and the terminal equipment 320. The terminal equipment 320 may be a cellular telephone, Personal Digital Assistant (PDA), laptop, plug-in wireless adapter, MTC terminal, or other device capable of radio communication over a wireless network. The apparatus 300 is further operatively coupled to the terminal equipment 320 by one or more data channels by which a terminal equipment identifier such as an IMEI may be accessed and provided to the apparatus 300. For example, in some embodiments, the apparatus 300 may be coupled to the microprocessor 322 of the terminal equipment 320 and capable of requesting that the microprocessor 322 perform a memory access operation which accesses non-volatile memory 324 of the terminal equipment 320 to obtain and provide a terminal equipment identifier held therein to the apparatus 300.

Verification Process

As described herein, a verification process may be performed in accordance with a method, apparatus or computer program product of the present invention. The verification process is initiated for identity modules which are determined to be in a bonded state, and performed by comparing one or more bonding identifiers stored thereon with at least a predetermined portion of a terminal equipment identifier stored in the terminal equipment, and shifting at least one of the identity module and the terminal equipment into predetermined operating conditions if a correspondence is identified via the comparison.

The verification process may be initiated and/or performed automatically by a computing device configured to execute software or firmware instructions held in memory, as would be readily understood by a worker skilled in the art. For example, in embodiments wherein the verification process is performed at least in part by a processor residing on an identity module card, such as a UICC, the processor may, following instructions held in identity module card memory, fetch bonding identifiers from specified memory locations on the identity module card, and communicate with the terminal equipment to fetch the terminal equipment identifier stored in memory thereof. A bit-by-bit or symbol-by-symbol comparison may then be performed by the processor and a correspondence declared if the comparison results in a predetermined level of matching. A worker skilled in the art would readily understand how to provide software instructions to perform the above-mentioned or other verification tasks, for example via a program element executed by the identity module.

In some embodiments, the verification process may be initiated upon a determination that the identity module is in a bonded state. Such determination may be performed by accessing a predetermined memory location of memory on the identity module, and determining if one or more bonding identifiers are stored therein. Additionally or alternatively, determination that the identity module is in a bonded state may be performed by accessing a predetermined memory location of memory on the identity module, and determining the state of a flag variable stored therein. For example, the flag variable may be set if the identity module is in a bonded state, and cleared otherwise. In a further embodiment, if the flag variable is cleared, the identity module is determined to be in a bonding-receptive state, as described herein. In some embodiments, determination of the bonded state may be performed automatically, for example when the identity module card is inserted or powered within or by the terminal equipment.

The verification process may be configured to perform verification corresponding to different levels of security. In some embodiments, only one bonding identifier is stored in the identity module, the bonding identifier encodes substantially all of a terminal equipment identifier, and comparison comprises comparing substantially all digits and/or characters and/or symbols in the bonding identifier with substantially all digits and/or characters and/or symbols of the terminal equipment identifier stored in the terminal equipment, a correspondence being declared if the bonding identifier substantially matches the terminal equipment identifier. This may provide an elevated level of security, since the identity module may only be verified when coupled with one particular terminal equipment.

In some embodiments, plural bonding identifiers may be stored in the identity module, a correspondence being declared if at least one bonding identifier substantially matches the terminal equipment identifier. In some embodiments, a correspondence may be declared if a match is determined between a predetermined portion of a bonding identifier and a predetermined portion of the terminal equipment identifier. Providing plural bonding identifiers or allowing partial matching may correspond to a decreased level of security, since such an identity module may be used with plural instances of terminal equipment. However, this may also allow for a desired level of flexibility, for example providing the capability of performing repairs in the field by switching out a defective piece of terminal equipment without having to replace or reconfigure the identity module associated therewith.

In some embodiments, when more than one bonding identifier is stored in the identity module, the verification process is performed sequentially on bonding identifiers. For example, the verification process may involve reading one bonding identifier, comparing it with the terminal identifier, and shifting into predetermined operating conditions if a correspondence is determined, or if the correspondence is not determined, repeating the process with another bonding identifier. In some embodiments, the verification process is performed concurrently on bonding identifiers. For example, plural bonding identifiers, or a range thereof, may be read substantially concurrently and compared with the terminal identifier, with shifting into predetermined operating conditions occurring if a correspondence is determined between at least one of the plural bonding identifiers and the terminal identifier. Plural bonding identifiers may be stored as a list, range, or by using bit masking or don't care conditions, or the like, or other approaches as would be readily understood by a worker skilled in the art.

In some embodiments, a bonding identifier is compared with only a predetermined portion of the terminal equipment identifier stored in the terminal equipment. This may allow an identity module to be portable within a predetermined subset of a plurality of terminal equipment, namely the subset of terminal equipment having terminal equipment identifiers which correspond with a bonding identifier of the identity module. In some embodiments, a bonding identifier may comprise all of a terminal equipment identifier, and only predetermined portions may be compared. In some embodiments, a bonding identifier may comprise only a relevant portion of a terminal equipment identifier for comparison.

For example, a bonding identifier may comprise at least a portion of an IMEI stored on the identity module, to be compared with a terminal equipment identifier comprising at least a portion of an IMEI stored on the terminal equipment. Verification may comprise comparing the first eight digits of the two respective IMEIs against each other and declaring a correspondence if said first eight digits match. For example, the first eight digits of an IMEI represent a Type Allocation Code (TAC), which is issued by a central regulatory body and may identify the model of the terminal equipment. Therefore, verification based on the TAC only may allow an identity module to be usable only with a specific model of terminal equipment. This may discourage theft or misappropriation of identity modules, for example, if the identity module is usable only with remote utility monitoring or MTC terminal equipment, whereas a potential thief or mis-user may desire an identity module for use with a personal communication device. Additionally, in this embodiment, terminal equipment of the same model will be interchangeable, thereby facilitating maintenance activities. Alternatively, if verification is based on a portion of the TAC, field upgrades of terminal equipment to newer models may also be facilitated, while still providing a desired level of security and deterrence against theft or misappropriation.

Bonding Process

As described herein, a bonding process may be performed in accordance with a method, apparatus or computer program product of the present invention. The bonding process comprises storing a bonding identifier in memory of the identity module, the bonding identifier for example corresponding to at least a portion of a terminal equipment identifier.

In some embodiments, the bonding process corresponds to pre-programming, for example during manufacture or initial set-up of the identity module, a bonding identifier into memory of the identity module. For example, the bonding identifier may be stored in read-only or non-volatile memory during manufacture or initial set-up using standard or specialized equipment, as would be readily understood by a worker skilled in the art. For example, the bonding identifier may be stored in a one-time programmable ROM chip during manufacture or field programming, or in a reprogrammable ROM chip, such as EEPROM or Flash memory, which may be subsequently locked to prevent rewriting. Such a bonding process may be performed even if the identity module is not coupled with its corresponding terminal equipment, provided that the appropriate portion of the terminal equipment identifier of the eventual corresponding terminal equipment is known. Bonding identifiers associated with an identity module may be substantially permanent. Identity modules may be manufactured for use only with a certain instance or model of terminal equipment, such as MTC terminal equipment.

In some embodiments, the bonding process may be automatically initiated when an unbonded identity module is coupled, inserted or powered when operatively coupled to appropriate terminal equipment. An identity module which does not have a bonding identifier stored thereon, or does not have a corresponding flag set, may automatically be in a bonding-receptive state, and a bonding process may be automatically performed upon insertion or power-on of the identity module.

In some embodiments, the bonding process may be initiated on an unbonded or bonded identity module by a local or remote user, for example by entering a password to dispose the identity module in a bonding-receptive state or by using specialized maintenance equipment, as necessary. In the case of an identity module which is already in a bonded state, the bonding process may be restricted, such that any new bonding identifiers stored in memory must be sufficiently close to one or more bonding identifiers previously stored in memory.

In some embodiments of the present invention, a determination is made as to whether the identity module is in a bonding-receptive state, and, if the identity module is in said bonding-receptive state, the bonding process is initiated. For example, the determination may be made when the identity module is inserted into or powered on in association with a terminal equipment. The determination may involve executing instructions, stored in memory, on an appropriate processor to determine whether a bonding identifier is stored in memory of the identity module, determining the state of a flag variable stored in memory, the flag variable indicative of whether the identity module is in the bonding-receptive state, or the like.

In some embodiments, the bonding process comprises reading at least a portion of the terminal equipment identifier from terminal equipment operatively coupled to the identity module, and storing at least a portion of the terminal equipment identifier in the identity module as a bonding identifier.

The bonding process may be performed automatically by a computing device configured to execute software or firmware instructions held in memory, as would be readily understood by a worker skilled in the art. For example, in embodiments wherein the bonding process is performed at least in part by a processor residing on an identity module card, such as a smart card, or terminal equipment, the processor may, following instructions stored in identity module card memory or other appropriate memory, communicate with the terminal equipment to fetch the terminal equipment identifier stored in memory thereof and store a bonding identifier or range of bonding identifiers in specified memory locations on the identity module card, based on at least a portion of the terminal equipment identifier. The processor may further set a flag variable, stored in memory of the identity module, indicative that the bonding process has been performed and the identity module is now in a bonded state. A worker skilled in the art would readily understand how to provide software instructions to perform the above-mentioned or other bonding tasks.

Bonding-Dissociation Process

As described herein, in some embodiments, a bonding-dissociation process may be performed in accordance with a method, apparatus or computer program product of the present invention. The bonding-dissociation process comprises deleting one or more bonding identifiers from memory of the identity module. This may be performed in order to reset the identity module in preparation for re-use, for example. In some embodiments, the bonding-dissociation process is purposefully absent or disabled for security purposes.

In some embodiments, the bonding-dissociation process may be initiated on a bonded identity module by a local or remote user, for example by entering a password. PIN, or the like to dispose the identity module in a bonding-dissociation state, as necessary. In some embodiments, the bonding-dissociation process may only be initiated if the identity module is powered within specialized maintenance equipment.

According to some embodiments of the present invention, there is no mechanism to dissociate the identity module from the terminal equipment bonded therewith. This can provide an elevated level of security. According to other embodiments, user-provided passwords such as PIN, PIN2 or Personalization Control Key (PCK) codes can be used to unlock a device and permit dissociation of the identity module from the terminal equipment, for example using Hayes (AT) commands or another appropriate interaction mechanism.

After being initiated, the bonding-dissociation process may be performed automatically by a computing device configured to execute software or firmware instructions held in memory, as would be readily understood by a worker skilled in the art. For example, in embodiments wherein the bonding-dissociation process is performed at least in part by a processor residing on an identity module card, such as a smart card, or a terminal equipment, the processor may, following instructions at least partially stored in identity module card memory or other appropriate memory, access specified memory locations on the identity module card containing bonding identifiers, and clear or delete said memory locations. Additionally or alternatively, in some embodiments, the processor may clear one or more flag variables in identity module memory indicative that the identity module is now in an unbonded state, bonding-receptive state, or both. In some embodiments, entry into the unbonded or bonding-receptive state occurs only if all bonding identifiers are deleted from memory. The bonding-dissociation process may be initiated by sending commands, such as AT commands, to an apparatus of the present invention from a device, such as a terminal equipment or specialized maintenance equipment, operatively coupled thereto. A worker skilled in the art would readily understand how to provide software instructions to perform the above-mentioned or other bonding tasks.

In some embodiments, clearing or deleting a memory location involves rewriting the memory location. In some embodiments, clearing, deleting, or effectively deleting a memory location involves adjusting a pointer or other program variable indicative of contents of the memory location, as would be readily understood by a worker skilled in the art.

In embodiments of the present invention, an apparatus for facilitating verification of an identity module operatively coupled to terminal equipment may be operatively coupled to the identity module and the terminal equipment. The apparatus may comprise a processing module operatively coupled to the identity module and the terminal equipment, the processing module configured to perform, partially perform, or facilitate performance of a verification process. In some embodiments, the processing module may further be configured to perform, partially perform, or facilitate performance of a bonding process, a bonding-dissociation process, or both.

For example, in some embodiments, in conjunction with performance of a verification process, the processing module may be configured to determine if the identity module is in a bonded state. Upon determining that the identity module is in said bonded state, the processing module may further be configured to perform a verification process, as described herein.

An apparatus in accordance with various embodiments of the present invention may be partially or substantially wholly formed on an identity module card, such as a smart card, SIM card, UICC. R-UIM, or the like.

In embodiments of the present invention, the apparatus or processing module thereof comprises a processor, such as a microprocessor, microcontroller, or the like, operatively coupled to a memory, such as a volatile, non-volatile, RAM, ROM, solid-state, optical, magnetic, or other digital memory, or a combination thereof. For example, a smart card such as a UICC may comprise a processor and memory disposed thereon, which are activated when supplied with power by terminal equipment when operatively coupled thereto.

In some embodiments, the apparatus is associated with hardware, such as a processor and memory, the hardware being configured or potentially configured to execute program instructions stored in memory. The apparatus may therefore be further associated with an application, such as a SIM or USIM application, or a software agent, or the like.

In the case of an identity module card, such as a smart card, operatively coupled to terminal equipment, it should be noted that both identity module card and terminal equipment may contain their own processors and memory. In this case, operations associated with functionality of the apparatus may be performed on one or more operatively coupled processors, and plural memories may also be involved in apparatus operation.

In some embodiments, the apparatus is associated with the identity module and identity module card, with key processing capabilities, program instructions, and stored bonding identifiers being associated therewith.

In some embodiments, one or more memories associated with the apparatus are configured to contain one or more of: program instructions to be executed on a processor to perform functionality of the apparatus, bonding identifiers stored in memory, and flag variables indicative of a state of the apparatus.

In some embodiments, bonding identifiers stored in memory may be encoded or encrypted, or both. For example, a list of bonding identifiers may be stored as one or more ranges, or one or more bonding identifiers and bitmasks. Bonding identifiers may be encrypted or otherwise securely stored to inhibit retrieval by an unauthorized person or program.

The invention will now be described with reference to specific examples. It will be understood that the following examples are intended to describe embodiments of the invention and are not intended to limit the invention in any way.

EXAMPLES

Example 1

A method according to an embodiment of the present invention comprises the following steps: The first time a new identity module card, such as a UICC, is powered on in association with a terminal equipment, an application associated with the identity module card, herein called the bonding application, will read the terminal equipment identifier, such as the MEI, from the terminal equipment and store this within the identity module or identity module card. The identity module card will also change states from a bonding-receptive state to a bonded state. Subsequently, whenever the identity module card is operatively coupled to terminal equipment, or the terminal equipment is powered up with the identity module already in place, the terminal equipment identifier is read from the terminal equipment and compared with one or more terminal equipment identifiers stored within the identity module or identity module card. If a predetermined correspondence condition is reached, then the identity module and/or terminal equipment are shifted into predetermined operating conditions, for example placed in a fully operational state, for example by allowing a SIM or USIM application associated with the identity module to start. Otherwise, invocation of functionality associated with the predetermined operational conditions is restricted, such that the identity module and/or terminal equipment are not shifted into said predetermined operating conditions. For example, the identity module and/or terminal equipment may instead be placed in reduced-operational or non-operational state. For example, a reduced-operational state may be entered by preventing a SIM or USIM application of the identity module from starting. The predetermined correspondence condition may require, for example, that a predetermined portion of the terminal equipment identifier read from the terminal equipment matches a predetermined portion of one or more terminal equipment identifiers stored within the identity module or identity module card, for example by performing a character-by-character comparison or the like.

Example 2

In some embodiments, the bonding identifier and terminal equipment identifier correspond to International Mobile Equipment Identities (IMEIs) or International Mobile Equipment Identities and Software Version Numbers (IMEISVs). The IMEI or IMEISV of each instance of terminal equipment is intended to be unique. The standardized format of IMEIs and IMEISVs are specified, for example, in the 3GPP technical standard entitled "Digital cellular telecommunications system (Phase 2+); Universal Mobile Telecommunications System (UMTS); Numbering, addressing and identification (3GPP TS 23.003, version 7.8.0 Release 7)," and described briefly herein.

An IMEISV can be configured in the format AA-BBBBBB-CCCCCC-EE, wherein each letter is associated with a decimal digit in practice. Different portions of the IMEISV code correspond to different IMEISV-compliant field. A correspondence between the IMEISV format AA-BBBBBB-CCCCCC-EE and the IMEISV-compliant fields may be described in Table 1 as follows:

TABLE 1

| AA | BBBBBB | CCCCCC | EE |
|---|---|---|---|
| Reporting Body Identifier portion of TAC. | Remainder of the TAC. | Serial number of the model. | Software Version Number (SVN). |

In some embodiments, an IMEI can be configured in a similar format, except that the two SVN digits are replaced with a single spare digit or check digit. The AA-BBBBB portion of the identifier is referred to as the Type Allocation Code (TAC). The AA portion is a reporting body identifier indicating a GSMA-approved group that allocated the terminal equipment model. The manufacturer and terminal equipment model numbers are indicated by the BBBBBB portion of the TAC. The CCCCCC portion of the identifier is an individual serial number uniquely identifying each instance of terminal equipment within each TAC. The EE portion of the identifier is a software version number (SVN) identifying the version of software used in the terminal equipment.

In embodiments of the invention, the bonding identifier comprises one or more portions, each corresponding to one or more IMEI or IMEISV-compliant fields. According to an embodiment of the present invention, the bonding process comprises storing at least the AA-BBBBBB (TAC) fields of the IMEI or IMEISV in the identity module, and the verification process comprises comparing the AA-BBBBBB (TAC) fields stored in the identity module against the AA-BBBBBB (TAC) fields stored in associated terminal equipment. In this case the UICC can still be used with other instances of a terminal equipment of the same model type. This may be useful, for example, when terminal equipment may need replacing in the field due to failure, but when a new identity module or identity module card is not required. This may be particularly useful for facilitating maintenance of machine type communication (MTC) equipment, such as remote monitoring equipment, which are typically specialized devices having special or restricted functionality. This discourages theft of an identity module bonded to MTC terminal equipment, since a potential thief would not be able to use the identity module in devices which are not bonded to that identity module.

According to some embodiments of the present invention, the verification process comprises comparing a portion of the TAC field stored in the identity module against a corresponding portion of the TAC field stored in associated terminal equipment. For example, the first seven digits of the TAC field may be compared. This may allow the identity module to be usable with subsequent models of terminal equipment, for example to facilitate device upgrades, while still providing a level of security. For example, the terminal equipment initially associated with an identity module and having a TAC of AA-BBBBBX may be replaced with a newer model of terminal equipment having a TAC of AA-BBBBBY, where AA and BBBBB are identical numbers between old and new terminal equipment, while X and Y may be different numbers.

According to some embodiments, the verification process comprises comparing at least a portion or range of an IMSI serial number field stored in the identity module against a corresponding portion or range of an IMSI serial number field stored on the associated terminal equipment. This may provide additional security or tracking capabilities.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device, solid state, magnetic or optical wire, tape or disc, or the like, for storing signals readable by a machine, for controlling the operation of a computer and/or firmware according to the method of the invention and/or to structure its components in accordance with the system of the invention.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any appropriate computer or computing device, and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for facilitating verification of an identity module operatively coupled to a terminal equipment, the method comprising:
   a. determining if the identity module is in a bonded state, wherein the bonded state is permanent, and wherein the bonded state corresponds to storage of one or more bonding identifiers in a one-time programmable memory of the identity module; and
   b. if the identity module is in said bonded state:
      i. reading the one or more bonding identifiers from the identity module;
      ii. comparing the one or more bonding identifiers with at least a predetermined portion of a terminal equipment identifier stored in the terminal equipment, the predetermined portion corresponding to less than all of the terminal equipment identifier, wherein said terminal equipment identifier is an International Mobile Equipment Identity (IMEI) or International Mobile Equipment Identity and Software Version Number (IMEISV); and
      iii. shifting at least one of the identity module and the terminal equipment into predetermined operating conditions if at least one of the one or more bonding identifiers corresponds with at least said predetermined portion of the terminal equipment identifier.

2. The method according to claim 1, further comprising:
   a. determining if the identity module is in a bonding-receptive state; and
   b. if the identity module is in said bonding-receptive state:
      i. reading at least a portion of the terminal equipment identifier from the terminal equipment; and
      ii. storing at least a portion of the terminal equipment identifier in the identity module as a bonding identifier.

3. The method according to claim 2, further comprising: disposing the identity module in a bonded state upon said storing at least a portion of the terminal equipment identifier in the identity module as a bonding identifier.

4. The method according to claim 1, wherein the identity module is associated with a Universal Integrated Circuit Card (UICC).

5. The method according to claim 1, wherein at least one of the one or more bonding identifiers comprises one or more portions, each of said one or more portions corresponding to one or more IMEI or IMEISV-compliant fields selected from the group consisting of: type allocation code, reporting body identifier, allocation number, serial number, check digit, and software version number.

6. The method according to claim 1, wherein the terminal equipment identifier is an electronic certificate.

7. The method according to claim 6, wherein the electronic certificate includes information relating to the terminal equipment with which the terminal equipment identifier is associated, wherein said information relates to one or more of approval status, features, optimizations and terminal equipment type.

8. An apparatus for facilitating verification of an identity module operatively coupled to a terminal equipment, the apparatus comprising a processing module operatively coupled to the identity module and the terminal equipment, the processing module configured to:
   a. determine if the identity module is in a bonded state, wherein the bonded state is permanent, and wherein the bonded state corresponds to storage of one or more bonding identifiers in a one-time programmable memory of the identity module; and
   b. if the identity module is in said bonded state:
      i. read the one or more bonding identifiers from the identity module;
      ii. compare the one or more bonding identifiers with at least a predetermined portion of a terminal equipment identifier stored in the terminal equipment, the predetermined portion corresponding to less than all of the terminal equipment identifier, wherein said terminal equipment identifier is an International Mobile Equipment Identity (IMEI) or International Mobile Equipment Identity and Software Version Number (IMEISV); and iii. shift at least one of the identity module and the terminal equipment into predetermined operating conditions if at least one of the one or more bonding identifiers corresponds with at least said predetermined portion of the terminal equipment identifier.

9. The apparatus according to claim 8, the processing module further configured to:
a. determine if the identity module is in a bonding-receptive state; and
b. if the identity module is in said bonding-receptive state:
i. read at least a portion of the terminal equipment identifier from the terminal equipment; and
ii. store at least a portion of the terminal equipment identifier in the identity module as a bonding identifier.

10. The apparatus according to claim 9, the processing module further configured to dispose the identity module in a bonded state upon said storing at least a portion of the terminal equipment identifier in the identity module as a bonding identifier.

11. The apparatus according to claim 8, wherein the identity module is associated with a Universal Integrated Circuit Card (UICC).

12. The apparatus according to claim 8, wherein at least one of the one or more bonding identifiers comprises one or more portions, each of said one or more portions corresponding to one or more IMEI or IMEISV-compliant fields selected from the group consisting of: type allocation code, reporting body identifier, allocation number, serial number, check digit, and software version number.

13. The apparatus according to claim 8, wherein the terminal equipment identifier is an electronic certificate.

14. The apparatus according to claim 13, wherein the electronic certificate includes information relating to the terminal equipment with which the terminal equipment identifier is associated, wherein said information relates to one or more of approval status, features, optimizations and terminal equipment type.

15. The apparatus according to claim 8, wherein the processing module comprises a microprocessor operatively coupled to a digital memory.

16. The apparatus according to claim 8, wherein at least a portion of the processing module is contained within an identity module card.

17. A computer program product comprising a memory having embodied thereon statements and instructions for execution by a computer, thereby causing the computer to perform a method for facilitating verification of an identity module operatively coupled to a terminal equipment, the method comprising the steps of:
a. determining if the identity module is in a bonded state, wherein the bonded state is permanent, and wherein the bonded state corresponds to storage of one or more bonding identifiers in a one-time programmable memory of the identity module; and
b. if the identity module is in said bonded state:
i. reading the one or more bonding identifiers from the identity module;
ii. comparing the one or more bonding identifiers with at least a predetermined portion of a terminal equipment identifier stored in the terminal equipment, the predetermined portion corresponding to less than all of the terminal equipment identifier, wherein said terminal equipment identifier is an International Mobile Equipment Identity (IMEI) or International Mobile Equipment Identity and Software Version Number (IMEISV); and
iii. shifting at least one of the identity module and the terminal equipment into predetermined operating conditions if at least one of the one or more bonding identifiers corresponds with at least said predetermined portion of the terminal equipment identifier.

* * * * *